INVENTOR
JACQUES EDOUARD FLICHY
BY
Woodhams, Blanchard & Flynn
ATTORNEYS

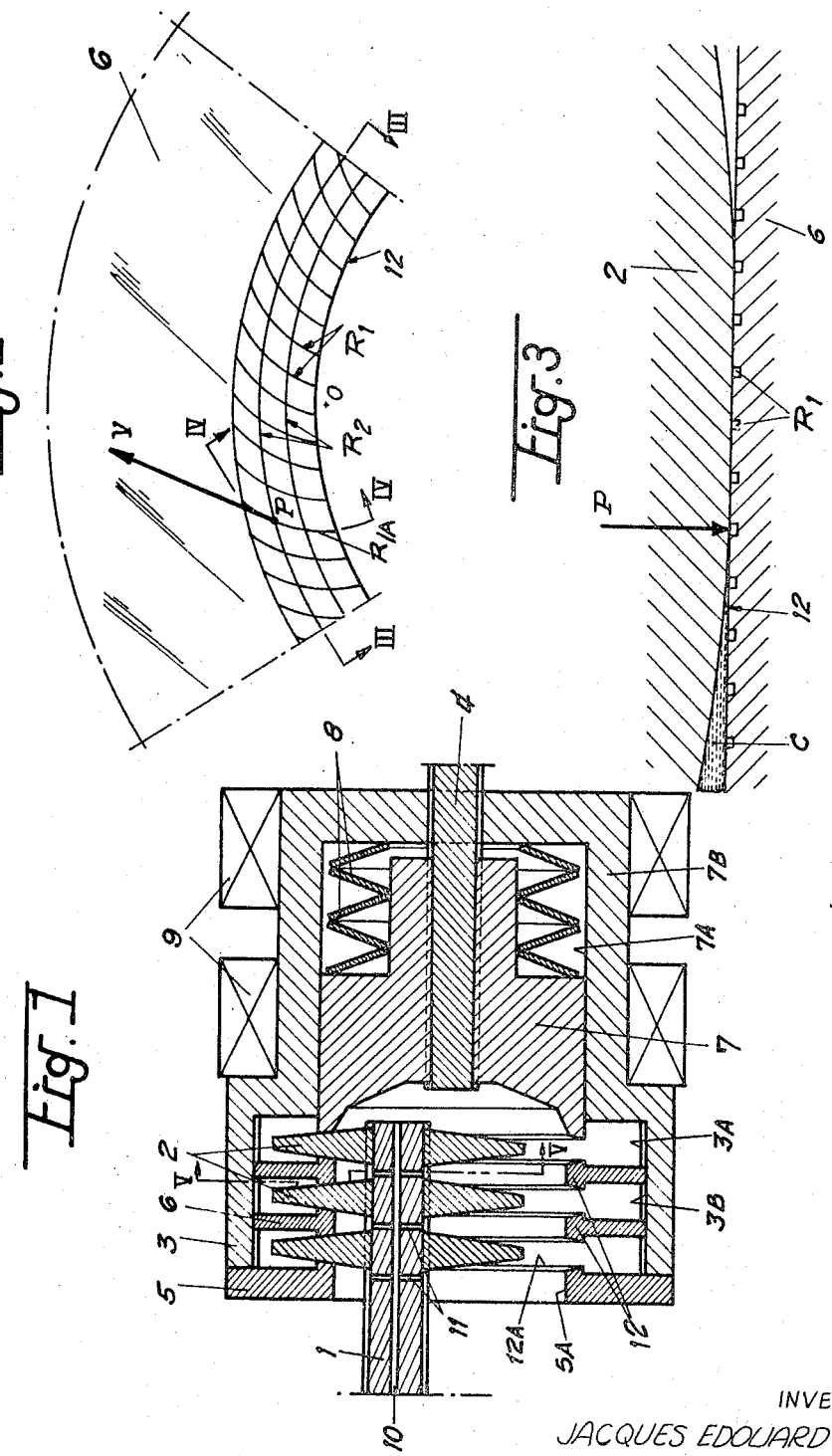

United States Patent Office 3,347,107
Patented Oct. 17, 1967

3,347,107
DEVICES EMPLOYING A FRICTION DRIVE BETWEEN TWO SURFACES IN A LIQUID MEDIUM
Jacques Edouard Flichy, Paris, France, assignor to Ateliers Metallurgiques de Saint-Urbain, a company of France
Filed Nov. 30, 1964, Ser. No. 414,647
Claims priority, application France, June 8, 1961, 864,314, Patent 1,299,074; Oct. 31, 1961, 877,511; Dec. 2, 1963, 955,733, Patent 1,386,365; Nov. 12, 1964, 994,646 (addition)
14 Claims. (Cl. 74—199)

This application is a continuation-in-part of Ser. No. 200,193, filed June 5, 1962, entitled Multi-Disc Speed Changing Unit, now Patent No. 3,245,272.

A large number of devices are already known which make use of a friction drive between two smooth and nonparallel surfaces in a liquid medium. It is therefore solely by way of illustrative example, and not in any sense by way of limitation, that reference will be made in the following description to a speed-changing mechanism of the type comprising a driving shaft on which are formed splines. A plurality of cone-shaped discs are supported on said shaft for axial sliding motion and the combined assembly is placed within a driving drum which is integral with a driven shaft. Said drum has internal splines along which are adapted to slide rings having a circular internal portion in the form of an annular enlargement, and said rings are interleaved between the discs. Means are provided for the purpose of pressing the pile of discs and rings together and for the purpose of modifying the distance between the axis of the driving shaft and the axis of the drum.

In the above assembly, the two surfaces which provide a friction drive are constituted by the lateral or axial surface of a disc on the one hand and the lateral or axial surface of the annular enlargement of a ring on the other hand. In addition, the engaged surfaces of the rings and discs work in a liquid medium, such as oil, which is admitted axially into the apparatus.

The applicant has studied the means for improving the friction drive between two generally smooth surfaces of this type and has observed that the liquid wedge which is formed in the contact zone of said surfaces is extremely unfavorable to the transmission of power since it reduces the apparent coefficient of friction.

In point of fact, the applicant has discovered that it is possible to reduce to a very substantial extent the influence of the liquid wedge by forming in at least one of the smooth surfaces a series of grooves which are fine and closely spaced such as, for example, greater in number than four per centimeter and which have their terminal ends outside the zone of engagement. The action of such grooves is all the more marked as the number of grooves is greater, within the limits of retaining a generally smooth surface.

It should be pointed out that the term "fine" grooves is understood to mean grooves having a cross-sectional area which is as small as industrially economic methods of machining will permit. On a metallic surface, for example, grooves can readily be cut which have a cross-sectional width in the order of one-tenth of a millimeter, and it is a dimension of this order which it therefore appears necessary to adopt.

Similarly, it should be explained that the expression "closely spaced" grooves implies a number of grooves which is greater than four per centimeter, this number being limited by the need to retain a surface which may be considered as smooth. It should be added that, in practice, it would not be permissible to exceed a certain maximum number of grooves, above which the unitary pressure exerted between the two surfaces would exceed that which can be withstood by the materials of the surfaces in contact without subjecting one or both surfaces to non-elastic deformation. For example, in the case of grooves formed in a metal surface, each groove having the cross-sectional dimension stated above, it would appear advisable to allow a distance between two successive grooves which is not less than approximately three times the width of said grooves.

To revert to the example which has been chosen, the applicant has found that the friction drive, which is provided by a speed-changing mechanism in accordance with this example, was considerably improved and could transmit torques of double or even more than double the value, all other things being equal, if grooves such as those specified above were cut either in one or in the other of the driving surfaces. The grooves are preferably in the lateral surfaces of the annular enlargements of the rings, this being due in all likelihood to the fact that the liquid which forms a wedge is discharged more readily through the grooves in the rings, thereby sustaining a considerable pressure drop while maintaining adequate lubricating and cooling effects.

As a preferable feature, the grooves in accordance with the invention are formed in a first surface parallel to the mean direction of the relative velocity of the second surface with respect to the first, said relative velocity being considered in the zone of maximum pressure of the liquid wedge under normal operating conditions of the apparatus. This arrangement facilitates the discharge of liquid through the grooves by permitting the propulsion of the liquid as a result of the movement of the second surface relatively to the first.

The applicant has also discovered that it is possible to reduce the mean pressure of the liquid wedge even further and therefore to achieve a further improvement in the friction drive by forming a second series of grooves crosswise with respect to the first, thereby creating a further succession of lines of zero pressure (or more precisely of pressure which is equal to the mean pressure of the liquid outside the wedge).

As a preferable feature, the grooves of the second series are at least approximately perpendicular to the grooves of the first series.

A clear understanding of the invention will in any case be gained by consideration of the description which now follows, reference being made to the accompanying drawings which show by way of non-limitative example a speed-changing mechanism provided with grooves in accordance with the invention, and in which:

FIG. 1 shows the speed-changing mechanism in diagrammatic, central cross-section;

FIG. 2 is a fragmentary, lateral view of one of the rings shown on a larger scale;

FIG. 3 is an enlarged sectional view substantially as taken along the line III—III in FIGURE 2 and showing the relative locations of the grooves and the wedge of lubricant.

Figure 5:
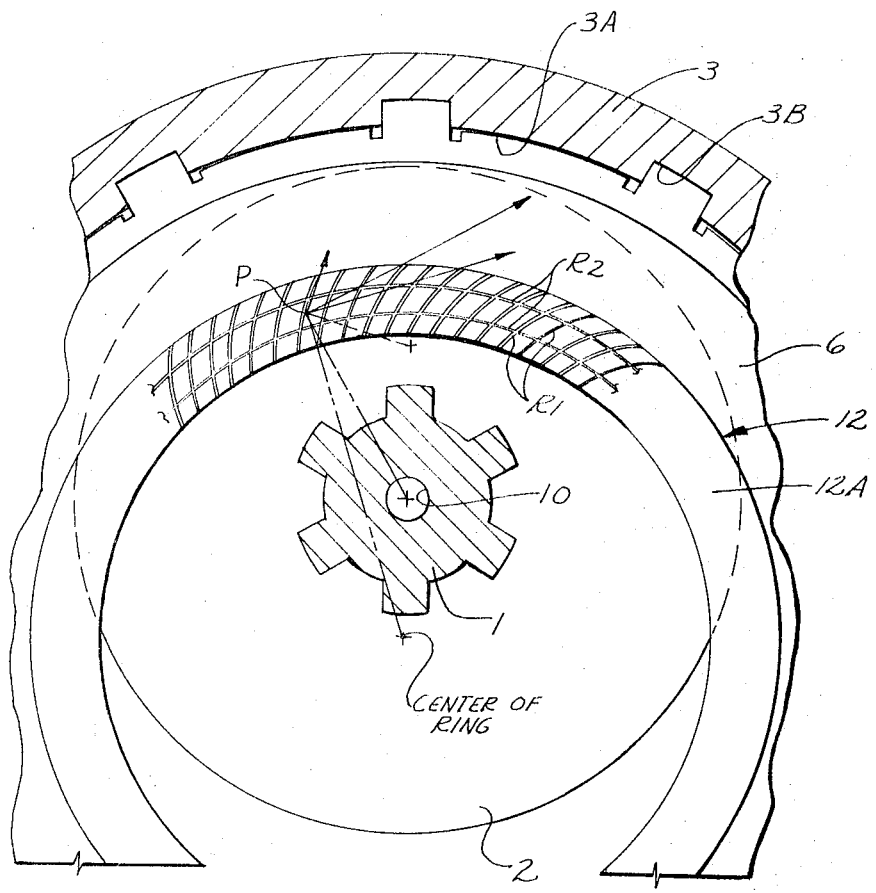
FIGURE 5 is a diagrammatic, cross-sectional view of the speed-changing device substantially as taken along the line V—V in FIGURE 1.
Figure 4:
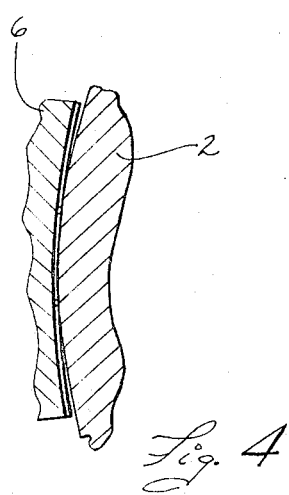
FIGURE 4 is a sectional view substantially as taken along the line IV—IV in FIGURE 2 and showing both engaging surfaces.

Reference being made to FIG. 1, it can be seen that a speed-changing mechanism embodying the invention is essentially composed of a driving shaft 1, said shaft being provided with splines and encircled by cone discs 2 which are adapted to slide axially of the shaft. The combined assembly is placed inside a drum 3 which is made fast for rotation with a driven shaft 4, the said driving shaft 1 being adapted to extend inside the drum through the central opening 5A in the end-plate 5. Between the discs 2 are interleaved rings 6 provided with annular enlargements 12. The first enlargement 12A is integral with the end-plate 5. The last enlargement is located at the opposite end of the drum chamber 3A and is integral with a bell-shaped member 7 housed within the chamber 7A which is defined by a portion 7B of the drum 3 which is coaxial with, of less diameter than and in communication with the drum chamber 3A. The member 7 is urged by flexible washers 8 toward the end plate 5 whereby the discs 2 and the rings 6 are axially compressed. The intermediate rings 6 are capable of sliding within the drum chamber 3A along the splines 3B formed in the internal wall of the drum 3. The combined assembly is, for example, carried on roller-bearings 9.

It is known that a speed-changing mechanism of this type is operated by modifying the distance between the axis of the driving shaft 1 and that of the drum 3, with the result that the transmission ratio, which is equal to 1, if this distance is zero, varies progressively as the annular enlargements 12 penetrate deeper between the discs 2. The oil, in which the engaged surfaces of the rotating parts are immersed, can be supplied through an axial duct 10 in the shaft 1, and the duct 10 may or may not be extended by connection to the radial ducts 11.

It follows from the foregoing that the transmission of power from the shaft 1 to the drum 3 may be carried out solely as a result of friction between the engaged, lateral or axial surfaces of the discs 2 and the annular enlargements 12 of the rings 6.

It is for this reason that the applicant has made provision in the said annular enlargements for grooves such as those which are shown in FIG. 2.

There can be seen in FIGURE 2 an annular enlargement 12 of a ring 6 in which is formed a series of grooves $R_1$ which can have any desired cross-sectional configuration, for example rectangular. Each groove $R_1$ (FIG. 2) has a center of curvature, such as the center O for the groove $R_{1A}$. Each such center O occupies a predetermined position with respect to the instantaneous center of rotation of the corresponding disc and the mean position of the shaft 1 when its corresponding groove is located in the zone of maximum pressure of the liquid wedge. The point P, along each groove $R_1$ is located in the zone of maximum pressure of the liquid wedge when said point is in the zone in which the surfaces of the enlargement 12 and disc 2 are substantially in contact. Thus, when the point P of the groove $R_{1A}$, for example, is in the zone of maximum pressure, said groove $R_{1A}$ is substantially parallel to the vector V, which represents the direction of relative movement of the opposing point on the disc 2 with respect to the point P on the annular enlargement 12. It will incidentally be noted that the grooves $R_1$ are not necessarily circular. The ends of the grooves can be rectilinear over a short zone. Under other operating conditions, the shape of the grooves can be complex. A second series of grooves $R_2$ which can have the same cross-sectional area and configuration has been formed in the axial faces of the enlargements 12 concentrically with the rings 6.

As has been mentioned earlier, a speed-changing mechanism which is improved in this manner transmits torques which are considerably higher and even multiples of those which are transmitted when grooves are not provided.

In point of fact, the liquid or oil wedge C, which has been illustrated in FIG. 3 and which is formed between a disc 2 and an annular enlargement 12 in front of the zone in which the surfaces come into contact, is partially discharged through a grove $R_1$ and the oil pressure therein is therefore relatively low. The pressure along the transverse grooves $R_2$, which is already low since said grooves pass entirely through the liquid wedge, is rendered even lower by virtue of the fact that the grooves $R_2$ cross the grooves $R_1$.

It will in any case be readily understood that this application of the invention only constitutes one example among a large number of other applications which could be contemplated. Furthermore, the grooves could have been cut in the discs or in both surfaces. It will also be apparent that, if said grooves are cut in the discs, the working zone on the discs must be large enough to permit the adjustment of the apparatus over a larger radial surface. Thus, the grooves $R_1$ must be cut in the discs so as to take into account that the amount of variation in the direction of the relative speed is a function of the radius at the corresponding point of engagement between a disc and a ring.

What I claim is:

1. A speed-changing device comprising a friction drive having two members rotatable around axes, said members having smooth and substantialy nonparallel surfaces adapted to be engaged in a liquid medium, at least one of the smooth surfaces being provided with a series of forwardly sloped grooves which are fine and closely spaced, said grooves being arranged around one of said axes and cut in one of said surfaces, said grooves extending, at least partially, in a radial direction and being substantially parallel with the mean direction of the relative velocity of the other surface with respect to the one surface near the point of maximum pressure between said surfaces;

means supporting said members for rotation around said axes, said supporting means being capable of effecting relative transaxial movement of one of said members with respect to the other; and means urging said surfaces together.

2. A device employing a friction drive between two members rotatable around axes and having annular smooth surfaces adapted to be engaged in a liquid medium, characterized in that at least one of the smooth surfaces is provided with a series of grooves which are fine and closely spaced and which are greater in number than four per centimeter;

means supporting said members for rotation around said axes, a wedge of said liquid medium being formed between said surfaces, said supporting means being capable of effecting relative transaxial movement of one of said members with respect to the other, said grooves being parallel with the mean direction of the relative velocity of the one surface with respect to the other surface in the zone of maximum pressure of the wedge; and means urging said surfaces together.

3. A speed-changing device comprising a circular member and an annular member rotatable about axes, said members being relatively movable transaxially and having nonparallel surfaces, portions of which are adapted to be engaged in a liquid medium;

means supporting said members for rotation around said axes, said supporting means being capable of effecting said transaxial movement of one of said members with respect to the other;

means defining in one of said surfaces a plurality of substantially uniformly spaced grooves arranged along a circular path around one of said axes, said grooves being relatively narrow and shallow and being substantially uniformly distributed along said path, said grooves being greater in number than four per centimeter and at least a part of said path along said one surface being adapted for constant engagement with the surface on the other member, a wedge of said liquid medium being formed between said surfaces when said members are rotated; and pressure means yieldably pressing said members together so that said surfaces are urged toward each other.

4. A device in accordance with claim 3, characterized in that the grooves extend transversely of said path and the terminal ends of the grooves are located outside of the zone of engagement between said surfaces.

5. A device in accordance with claim 3, wherein the number of grooves is limited only by the fineness of the grooves which can be produced in said surfaces and by the distance between two adjacent grooves which is sufficient to withstand normal operating pressures; and wherein said axes are parallel.

6. A device in accordance with claim 3, wherein said circular member is a disc having radially converging, axial surfaces and the annular member has a pair of annular and concentric abutments on opposite axial sides thereof, said abutments having axial surfaces converging radially inwardly, the degree of convergence on said disc surfaces being approximately the same as the degree of convergence on said abutment surfaces; and
    wherein said grooves are located in said surfaces on said abutments, the minimum diameter of the surfaces on said abutments being less than the maximum diameter of the surfaces on said discs so that the surfaces on said discs and the surfaces on said abutments are continuously engageable.

7. A device in accordance with claim 3, characterized in that said grooves are curved and the terminal ends of said grooves are located in communication with substantially ambient pressure.

8. A device in accordance with claim 3, wherein said circular member has an inclined annular surface and the annular member has an annular and concentric abutment on one axial side thereof, said abutment having an inclined axial surface engaged with the annular surface on said circular member, the degree of inclination of said surface on said circular member being approximately the same as the degree of inclination of said abutment surface; and
    wherein said grooves are located in said surface on said abutment, the minimum diameter of the surface on said abutment being less than the maximum diameter of the surface on said circular member so that the surface on said circular member and the surface on said abutment are continuously engageable.

9. A device employing a friction drive comprising:
first and second circular members having relatively smooth, annular and nonparallel surfaces, portions of said surfaces being engaged in a liquid medium, and at least one of said smooth surfaces having a plurality of relatively small grooves disposed along said surface;
first and second means respectively supporting said first and second members for relative rotational movement and for relative, substantially linear movement between said members transverse of the direction of said rotational movement while maintaining said engagement, a wedge of said liquid medium being formed between said surfaces by said rotational movement; and
means urging said surfaces together.

10. A device in accordance with claim 9, wherein adjacent grooves are substantially parallel and a second series of spaced grooves is arranged transversely with respect to the first-mentioned grooves.

11. A device according to claim 9 wherein said small grooves are arranged in an annular path concentric with the circular member having said one smooth surface, said grooves being closely and substantially uniformly spaced along said one smooth surface, said grooves being greater in number than four per centimeter.

12. A device according to claim 11 wherein said small grooves extend in a substantially radial direction and both of said circular members are adapted for rotation.

13. A device according to claim 11 wherein said small grooves are substantially concentric and both of said circular members are adapted for rotation.

14. A speed-changing device comprising a friction drive having two members rotatable around axes, said members having smooth and nonparallel surfaces adapted to be engaged in a liquid medium, at least one of the smooth surfaces being provided with a series of forwarding sloped grooves which are fine and closely spaced, said grooves being arranged around one of said axes and extending, at least partially in a radial direction;
means supporting said members for rotation around said axes, said supporting means being capable of effecting relative transaxial movement of one of said members with respect to the other;
a second series of spaced grooves on said one surface, said second series of grooves being circular, substantially concentric with said one axis and arranged transversely with respect to the first-mentioned grooves; and
means urging said surfaces together.

References Cited
UNITED STATES PATENTS

| | | | |
|---|---|---|---|
| 2,775,331 | 12/1956 | Peterson | 192—113.2 |
| 3,099,927 | 8/1963 | Anderson | 74—199 |
| 3,202,253 | 8/1965 | Merritt | 192—113.2 |
| 3,238,818 | 3/1966 | Heintz | 74—199 X |

FOREIGN PATENTS

| | | |
|---|---|---|
| 787,579 | 12/1957 | Great Britain. |

ROBERT M. WALKER, *Primary Examiner.*

DAVID J. WILLIAMOWSKY, *Examiner.*

L. H. GERIN, *Assistant Examiner.*